(12) United States Patent
Goehlich et al.

(10) Patent No.: US 8,741,090 B2
(45) Date of Patent: Jun. 3, 2014

(54) METHOD AND DEVICE FOR JOINING ADHERENDS, AS WELL AS COMPONENT

(75) Inventors: Robert Alexander Goehlich, Hamburg (DE); Malte Sander, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/534,066

(22) Filed: Jun. 27, 2012

(65) Prior Publication Data

US 2012/0328820 A1 Dec. 27, 2012

Related U.S. Application Data

(60) Provisional application No. 61/501,277, filed on Jun. 27, 2011.

(30) Foreign Application Priority Data

Jun. 27, 2011 (DE) .......................... 10 2011 078 149

(51) Int. Cl.
 *B29C 65/00* (2006.01)
(52) U.S. Cl.
 USPC .................... 156/251; 156/275.1; 156/304.3; 156/304.5; 156/308.4; 156/509; 156/515
(58) Field of Classification Search
 None
 See application file for complete search history.

(56) References Cited

U.S. PATENT DOCUMENTS

| | | | | |
|---|---|---|---|---|
| 3,276,941 A * | 10/1966 | Burns | ............................. | 428/60 |
| 4,156,054 A * | 5/1979 | Gurewitsch | ................... | 428/583 |
| 4,215,516 A * | 8/1980 | Huschle et al. | ............... | 451/531 |
| 4,496,412 A * | 1/1985 | Ritter | ............................ | 156/157 |
| 4,555,293 A * | 11/1985 | French | ....................... | 156/308.4 |
| 4,618,387 A * | 10/1986 | Fisher et al. | .............. | 156/244.11 |
| 4,716,704 A * | 1/1988 | Murr | ............................... | 52/778 |
| 5,601,676 A * | 2/1997 | Zimmerman et al. | .......... | 156/98 |
| 6,233,896 B1 * | 5/2001 | Coup | ........................... | 52/586.1 |
| 6,284,089 B1 * | 9/2001 | Anderson et al. | .......... | 156/304.3 |
| 6,743,504 B1 * | 6/2004 | Allen et al. | .................... | 428/362 |
| 7,011,343 B1 * | 3/2006 | Shah | .......................... | 285/288.1 |
| 7,422,036 B2 * | 9/2008 | Burrows et al. | ............... | 138/157 |
| 7,681,924 B2 * | 3/2010 | Temple | ....................... | 285/288.1 |
| 7,828,925 B2 * | 11/2010 | Perron et al. | ................ | 156/304.4 |
| 2002/0100540 A1 * | 8/2002 | Savitski et al. | ............... | 156/157 |
| 2002/0157785 A1 * | 10/2002 | Anderson et al. | .......... | 156/304.3 |
| 2004/0025955 A1 * | 2/2004 | Skinner et al. | ................ | 138/157 |
| 2005/0028880 A1 * | 2/2005 | Smith | ............................ | 138/98 |
| 2011/0259462 A1 * | 10/2011 | Gaigler et al. | ................ | 138/155 |

FOREIGN PATENT DOCUMENTS

DE 10 2006 040 800 A1 3/2008

\* cited by examiner

*Primary Examiner* — Mark A Osele
*Assistant Examiner* — Nickolas Harm
(74) *Attorney, Agent, or Firm* — Carter, DeLuca, Farrell & Schmidt, LLP

(57) ABSTRACT

Disclosed are methods for firmly joining fiber-reinforced, plastic-based adherends, wherein depressions are introduced into opposing lateral surfaces of the adherends, and have injected into them a fiber-reinforced plastic material that serves as an adhesive, a device for implementing such a method, as well as a component joined in this way.

4 Claims, 6 Drawing Sheets

METHOD AND DEVICE FOR JOINING ADHERENDS, AS WELL AS COMPONENT

TECHNICAL FIELD

The invention relates to a method for firmly joining fiber-reinforced adherends and to a device for executing such a process, as well as to a component fabricated according to such a method.

BACKGROUND OF RELATED ART

Civilian aircraft are traditionally manufactured out of metal. However, aircraft parts or adherends, such as stressed-skin fuselages, circumferential stiffeners, longitudinal stiffeners, crossbeams, wing and empennage shells and the like, have most recently been increasingly being made out of fiber-reinforced plastic. For example, the latter exhibit carbon fibers, aramide fibers or glass fibers, which are arranged in a plurality of layers, embedded in a duroplastic matrix or thermoplastic matrix. The plastic-based adherends are routinely joined by means of joining methods known from metal construction, such as riveting or adhesive bonding. However, the plurality of rivet holes involved in riveting methods causes a weakening of the structure, which can be amplified by fiber tears, delamination and the like. In addition, the riveting methods are very time-intensive owing to the plurality of individual steps, such as aligning the adherends relative to each other, introducing the rivet holes, cleaning the rivet holes, and tacking and setting the rivets. In addition, bearing stress can be observed while riveting. Furthermore, quasi-isotropic properties of the adherends are not utilized in the riveting process, but rather regionally destroyed. By contrast, adhesive bonding methods require a very high level of cleanliness or complicated cleaning measures to prepare the bonding surfaces. In addition, the adhesives require a certain curing period, which also makes the bonding methods time-intensive. Furthermore, bonding methods must comply with strict requirements so as to prevent health risks to the personnel. In addition, the adhesive bond cannot be subjected to any nondestructive testing. Furthermore, the riveting methods and known bonding methods require a material overlap, so that the component to be fabricated is not optimized in terms of weight on the one hand, and an incremental load flow comes about on the other.

SUMMARY

The object of the invention is to provide a method for firmly joining fiber-reinforced, plastic-based adherends, which eliminates the present disadvantages, and enables a butt joint seam exhibiting a high strength. In addition, the object of the invention is to provide a device for implementing such a method, along with a joined component having an optimized weight and high joining seam strength.

In a method according to the invention for firmly joining fiber-reinforced, plastic-based adherends, the adherends are first positioned with opposing lateral surfaces to define a joining seam. Depressions are then introduced in the lateral surfaces. The depressions and a seam gap between the lateral surfaces are subsequently filled up with fiber-containing plastic material. The plastic material is then cured or set.

The method according to the invention makes it possible to create a butt joint seam with a high strength, since the depressions yield a plurality of bonding or joining surfaces. The depressions also result in a kind of tooth system, which forms a positive fit that supports the firm connection, thereby producing a positive adhesive bond. The method can be conveniently automated, which aside from short cycle times ensures a repeatable high joining seam quality and process quality. The fiber-containing plastic material acts as an adhesive, and most preferably has a plurality of shred-like carbon fibers, glass fibers, aramide fibers and the like, which are embedded in a liquid or fluid thermoplastic or duroplastic matrix, thereby ensuring that the plastic material sets or cures quickly. The fibers prevent the joining seam from becoming brittle. In principle, combining the opposing depressions with the fiber-containing plastic material imparts the same strength to a joined component in the seam region as exhibited by the adherends themselves. Furthermore, spacers and the like need not be used for complicatedly balancing out the tolerances of the adherends, since the depressions are only introduced after the adherends have been aligned relative to each other. As a consequence, no tensions owing to a deformation or warping of the adherends are introduced into the joining seam.

The adhesive effect can be improved by cleaning the depressions and seam gap before supplying the plastic material.

In one exemplary embodiment, the depressions are introduced with a rotational movement, and filled with the plastic material before one full rotation has been completed. This enables a particularly short cycle time, since two procedural steps are performed within a rotation.

In order to increase the number of depressions per lateral surface or per adherend, and hence raise the number of adhesive surfaces, the adherends can be at least unilaterally thickened in the area of the lateral surfaces.

The loading capacity of the joining seam can be raised by heating the plastic material to over its melting temperature in such a way as to melt the depressions onto the wall during injection, so that a quasi welding process takes place.

One device according to the invention for implementing a method according to the invention has a milling tool having a hinge pin that is to be introduced between adherends, and accommodates a plurality of blades for incorporating the depressions. The device makes it possible to simultaneously incorporate a plurality of depressions, thereby significantly reducing the cycle time.

In an exemplary embodiment, an injection tool is provided with a female pin having a plurality of hollow arms for injecting the plastic material into the depressions.

The depressions can be cleaned by providing a cleaning tool with a female pin having a plurality of hollow arms for purging the depressions.

In an exemplary embodiment, the depressions are milled and the plastic material is injected within a tool rotation by situating the blades on long milling arms, and a plurality of short hollow arms is provided for injecting the plastic material, which extend from the pin and are joined with a resin channel of the pin.

For example, the internal channel can be controllably opened and closed with a fixed control plate, which can be used to precisely define an injection window.

The component according to the invention is manufactured in a method according to the invention, and as such is distinguished by a joining seam with a high strength and quality, high structurally stability, load and weight-optimized lightweight construction, and a smooth load flow over the seam area.

Other advantageous exemplary embodiments of the invention are the subject of other subclaims.

BRIEF DESCRIPTION OF THE DRAWINGS

Preferred exemplary embodiments of the invention will be explained in greater detail below based on highly simplified, schematic diagrams. Shown on.

DETAILED DESCRIPTION

FIG. 1a to 3 presents a device according to the invention along with a method according to the invention for firmly joining two adherends 2, 4 in a butt joint or quasi butt joint. For example, adherends 2, 4 comprise fuselage skin sections to be joined together.

The adherends 2, 4 are fiber-reinforced laminates, which exhibit a plurality of layered fiber structures, such as fiber mats, woven fabric, prepregs and the like, which are embedded in a thermoplastic or duroplastic matrix. The fibers in the fiber structures are carbon fibers, glass fibers, aramide fibers, and the like designed as long fibers.

Figure 1:
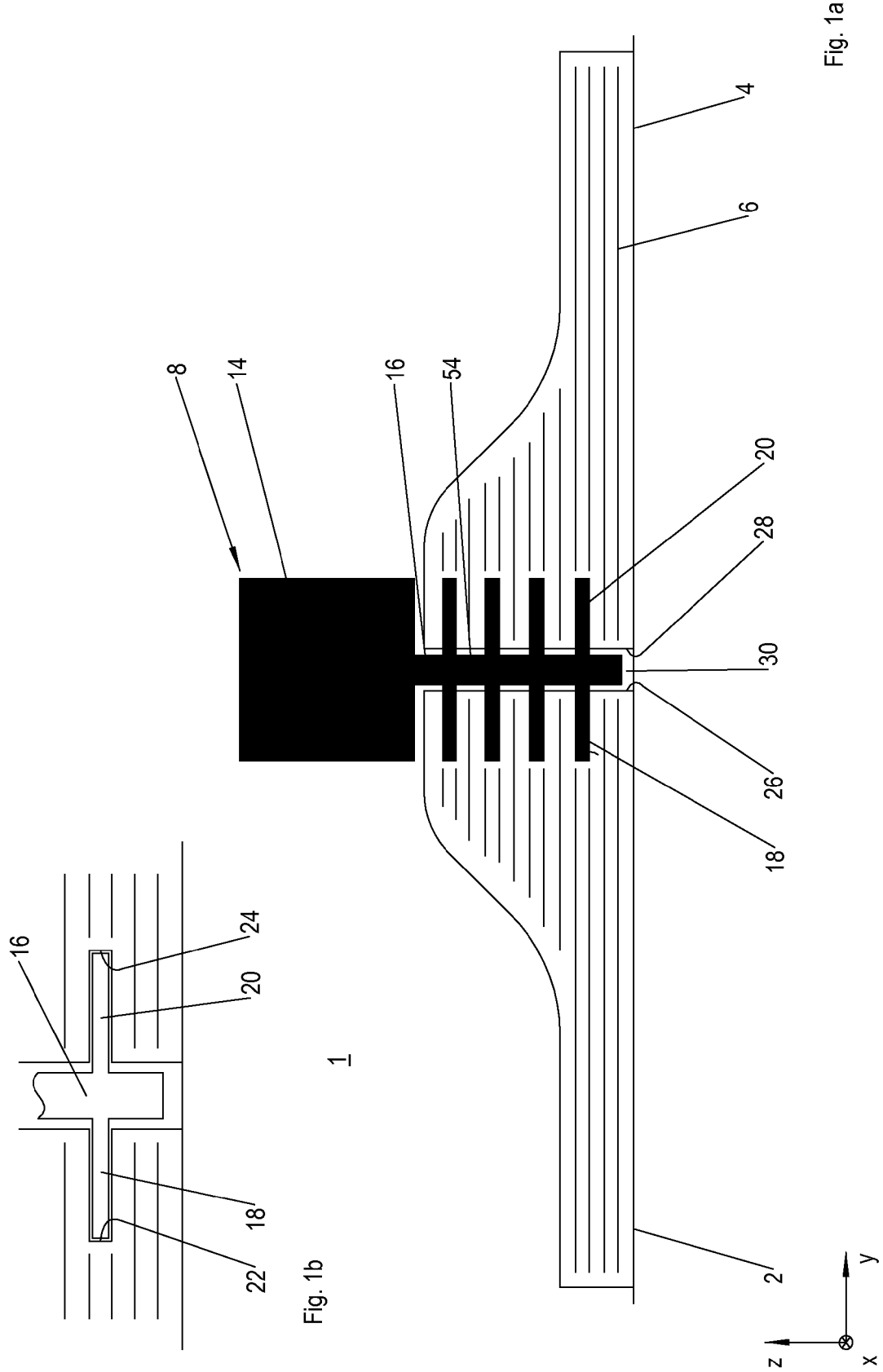
FIG. 1a is a first exemplary milling tool of a device according to the invention.
FIG. 1b is a detailed view of the milling tool.
Figure 2:
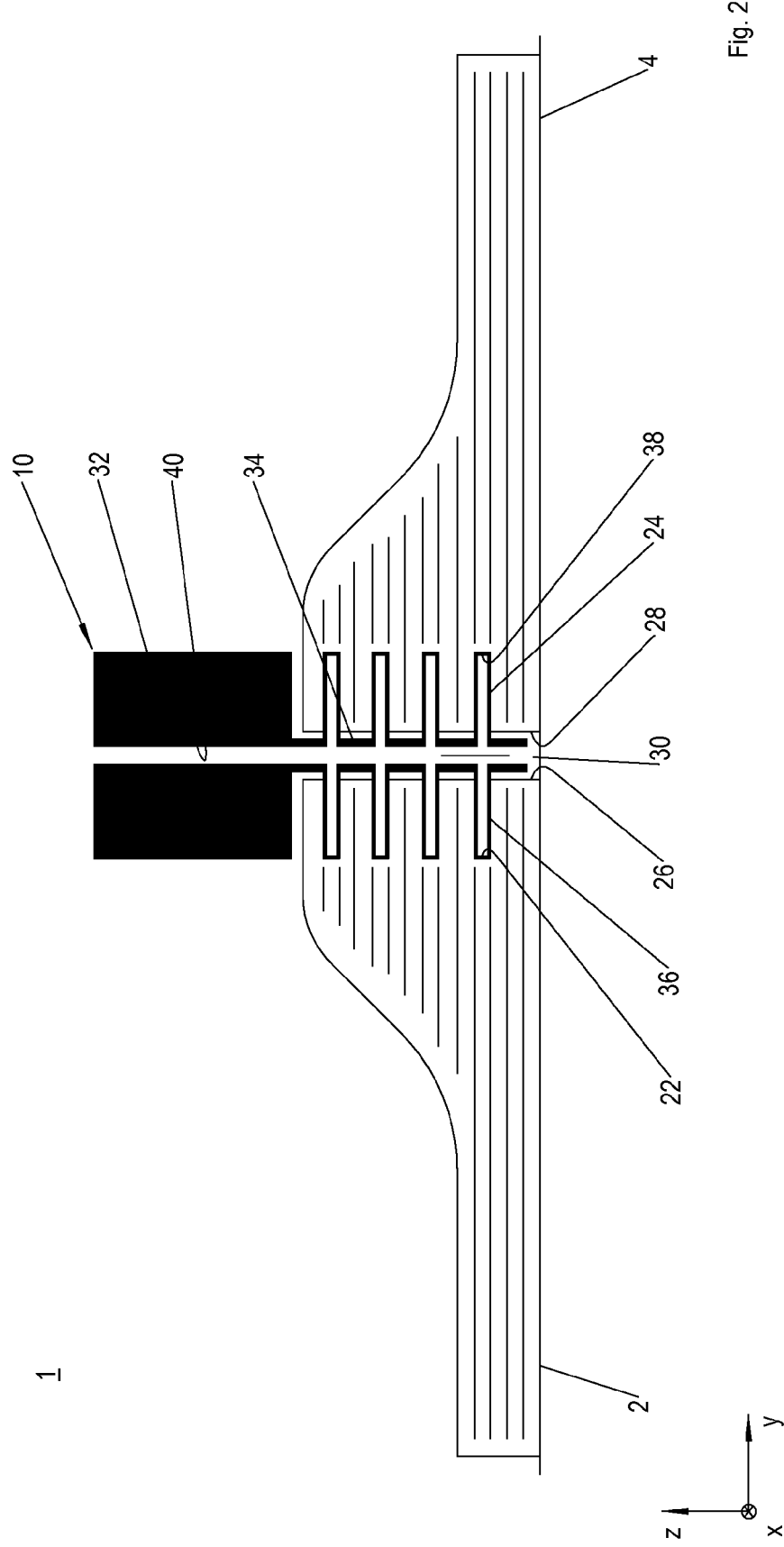
FIG. 2 is a first exemplary cleaning tool of the device according to the invention.
Figure 3:
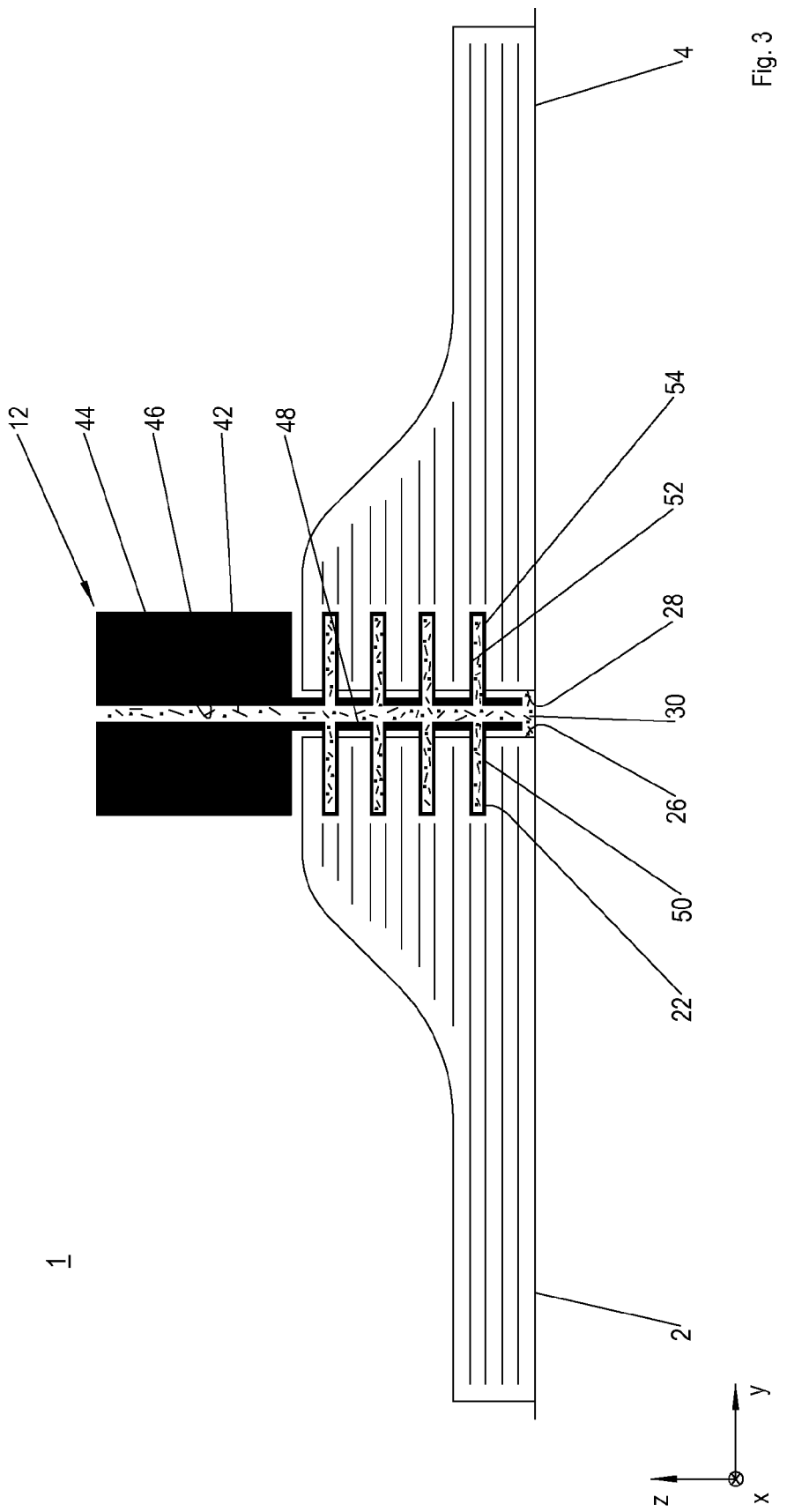
FIG. 3 is a first exemplary injection tool of the device according to the invention.

In order to firmly join the adherends 2, 4 in a butt joint, device 1 exhibits a milling tool 8 (FIG. 1), a cleaning tool 10 (FIG. 2) and an injection tool 12 (FIG. 3).

As shown on FIGS. 1a and 1b, the milling tool 8 has a basic body 14 that can be rotated around a vertical axis z, and has extending from it a hinge pin 16 with a plurality of milling arms 18, 20, on which are arranged unnumbered blades for incorporating groove-like depressions 22, 24 into opposing lateral surfaces 26, 28 of the adherends 2, 4. Two milling arms 18, 20 each oriented in opposite directions are most preferably provided to create a depression pair 22, 24.

The cleaning tool 10 depicted on FIG. 2 is used to purge the depressions 22, 24 so as to remove chips from the depressions 22, 24 and blow out a seam gap 30 that spaces the lateral surfaces 26, 28 apart from each other. It has a basic body 32, from which extends a female pin 34 having a number of hollow arms 36, 38 with outlet openings (not shown) that corresponds to the number of depressions. A blowing channel 40 passes through the basic body 32, wherein its free end is joined with a fan (not shown), and its other end is fluidically connected with the female pin 34 and hollow arms 36, 38. Two hollow arms 36, 38 are most preferably each oriented in opposite directions, so that one respective hollow arm 36, 38 can be immersed. To ensure reliable purging, the hollow arms 36, 38 preferably do not extend as far in the transverse direction y as the depressions 22, 2, and are hence spaced apart in the purging process even given an orthogonal orientation relative to the respective slot bottom. However, a rotating female pin 34 can alternatively be provided with only one respective hollow arm 36 per plane, so that two opposing depressions 22, 24 are each purged by a rotating hollow arm 36. One especially simple alternative in terms of the device provides only one female pin 34 with a plurality of radial outlet openings.

The injection device 12 shown on FIG. 3 is used to inject the fibrous plastic material 42 into the depressions 22, 24, as well as into the seam gap 30. The injection tool 12 has a basic body 44, through which passes a resin channel 46 acting as a feed channel, as well as a female pin 48 that is fluidically connected with the resin channel 46, and exhibits a number of hollow arms 50, 52 having outlet openings (not shown) that corresponds to the number of depressions 22, 24. Two hollow arms 50, 52 each oriented in opposite directions are most preferably provided to create a depression pair 22, 24. To ensure reliable injection, the hollow arms 50, 52 do not extend as far in the transverse direction y as the depressions 22, 2, and are hence spaced apart in the injection process, even given an orthogonal orientation relative to the respective slot bottom.

The plastic material 42 consists of a liquid or fluid duroplastic or thermoplastic matrix, into which are mixed a plurality of short or shred-like plastic fibers, glass fibers, aramide fibers. In order to achieve a strength similar to that of long fibers, the fibers can exhibit a roughened surface and/or small teeth or barbed hooks for interlocking purposes.

In a method according to the invention, the adherends 2, 4 are first aligned relative to each other. To this end, they are spaced apart from each other via the seam gap 30, and thus quasi-positioned in a butt joint in relation to each other. The seam gap 30 is used to accommodate axial shank sections 54 of the hinge pin 16 between the arms 18, 20, and for this purpose exhibits a width or extension in the transverse direction 6 that corresponds to the outer shank diameter of the hinge pin 16. In addition, the seam gap 30 defines a progression, and hence longitudinal direction x, of a joining seam or butt joint seam 56 shown on FIG. 4. While the adherends 2, 4 can alternatively be directly arranged in a butt joint with reciprocally contacting lateral surfaces 26, 38, the shank sections 54 must be furnished with blades to this end.

After the adherends 2, 4 have been aligned, the depressions 22, 24 are introduced into the lateral surfaces 26, 28. For this purpose, the milling tool 8 is positioned relative to the adherends 2, 4, made to rotate, and moved in longitudinal direction x. The depressions 22, 24 each have a grooved, identical cross section, and are paired one over the other in single planes in the vertical direction z. To enable a plurality of depression planes, the adherends 2, 4 are at least unilaterally thickened in the joining area beforehand, i.e., prior to aligning the adherends 2, 4 relative to each other.

After the depressions 22, 24 have been milled, both they and the seam gap 30 are cleaned to remove chips, dust and other contaminants. To this end, the cleaning tool 10 is situated in the joining zone 6 in such a way that its hollow arms 36, 38 engage in the depressions 22, 24. The cleaning tool 10 is moved in the longitudinal direction x, and both the depressions 22, 24 and seam gap 30 are purged.

Once cleaned, the fluid, fibrous plastic material 42 is injected into the depressions 22, 24 and seam gap 30. For this purpose, the injection tool 12 is positioned between the adherends 2, 4, during which its hollow arms 50, 52 plunge into the depressions 22, 24. The injection tool 12 is now moved in the longitudinal direction x, and the plastic material 44 is concurrently injected into the depressions 22, 24, as well as into the seam gap 30. To improve the firm connection, the plastic material 42 can be heated to in excess of its melting temperature, so that the temperature of the plastic material 42 causes the depression walls to become melted on during the injection process, as a result of which the adherends 2, 4 become quasi welded together after the joining zone 6 has cured or set.

Figure 4:
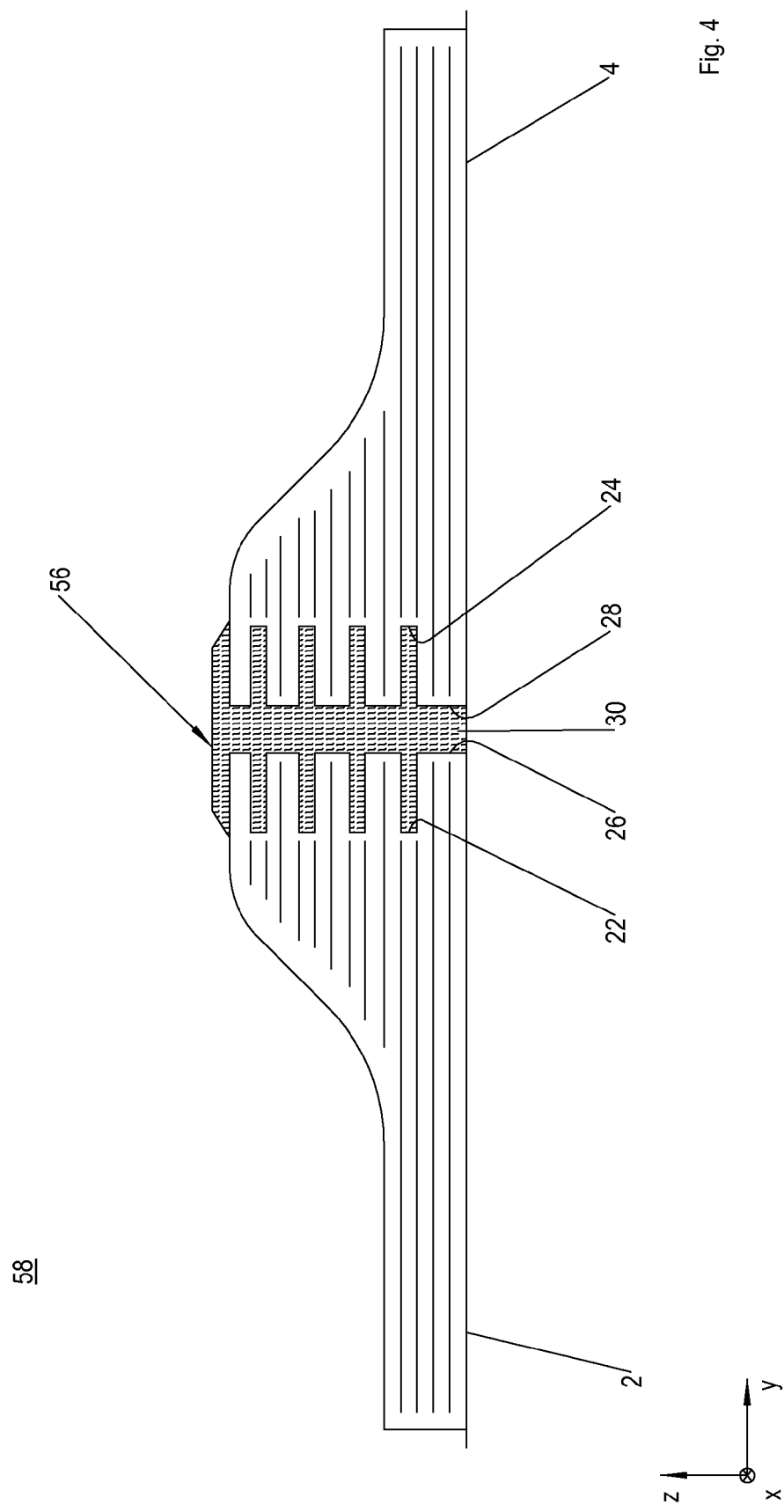
FIG. 4 is a butt joint seam according to the invention.

The method or joining process concludes with the injection of the plastic material 44, and the plastic material 42 can then be set to the toothed butt joint seam 56 shown on FIG. 4 or, when using a duroplastic matrix, be cured while undergoing a thermal/pressure treatment, e.g., in an autoclave. The adherends 2, 4 are now permanently connected with each other to form a component 58 firmly joined in a butt joint.

Figure 5:
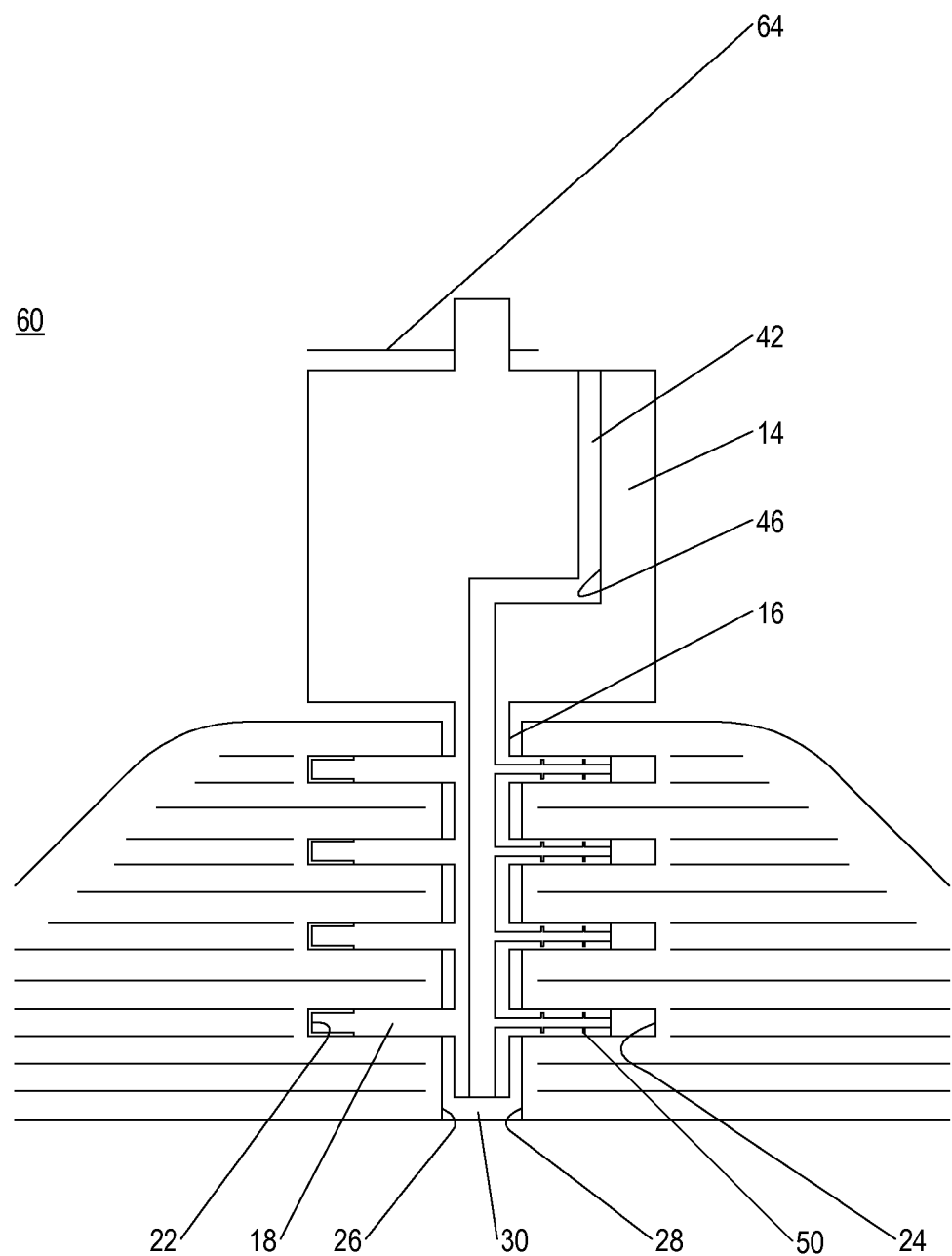
FIG. 5 is an exemplary embodiment of a combined milling/injection tool of the device according to the invention.

A device variant depicted on FIG. 5 has a combined milling/injection tool 60. The latter has a basic body 14 that can be rotated around a vertical axis z, and has extending from it a hinge pin 18 with a plurality of unilaterally aligned milling arms 18. The milling arms 18 each have at least one unnumbered blade to form a plurality of depressions 22, 24 in opposing lateral surfaces 26, 28 of the adherends 2, 4 to be firmly joined. In addition, the hinge pin 16 has a plurality of hollow arms 50, which are aligned opposite the milling arms 18 defining the milling circle 62, as illustrated on FIG. 6. The hollow arms 50 are shorter than the milling arms 18, and connected by way of a resin channel 46 with a feeding device (not shown) for supplying fiber-reinforced plastic material 42 in order to form a butt joint seam 56. The resin channel 46 exits from the face of the hinge pin 16, and penetrates through the basic body 14 in the vertical direction z. In order to open and close the resin channel 46, the milling/injection tool 60 has a fixed, half disk-like control plate 64, which when the basic body 14 is rotated simultaneously opens the resin channel 46 in an angular range of 180° and closes it in an angular range of 180°, as shown on FIG. 7.

Figure 6:
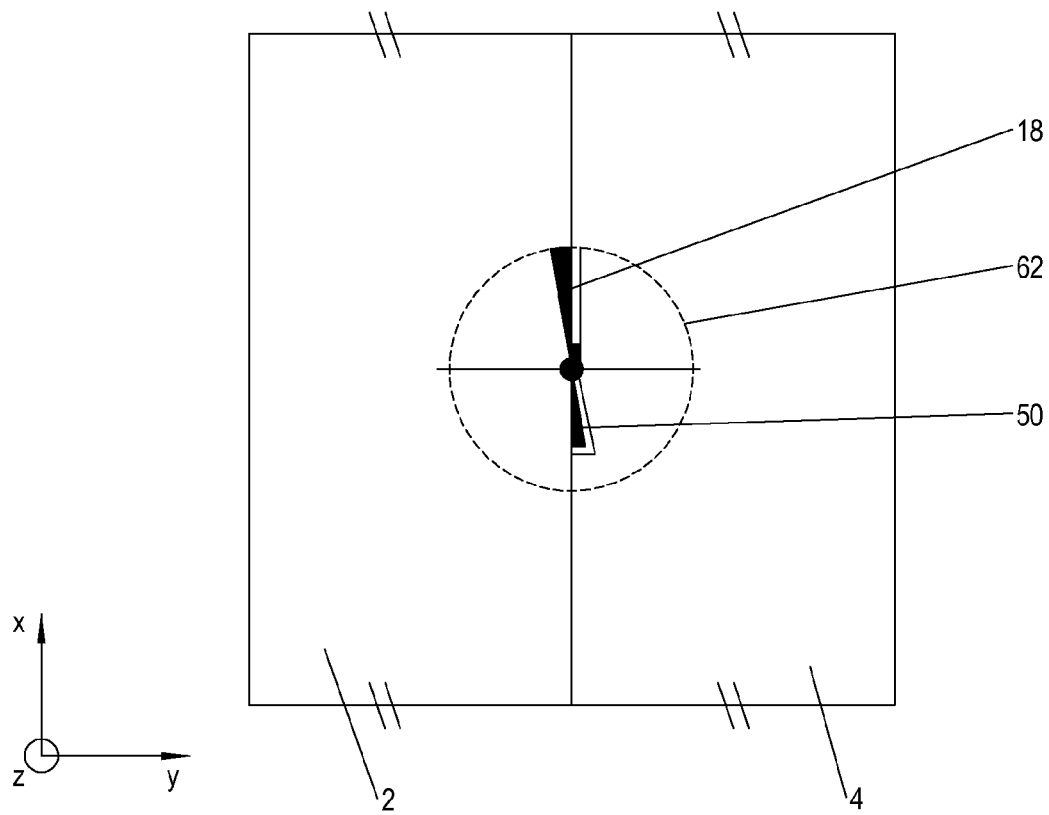
FIG. 6 is a section through the device from FIG. 2.
Figure 7:
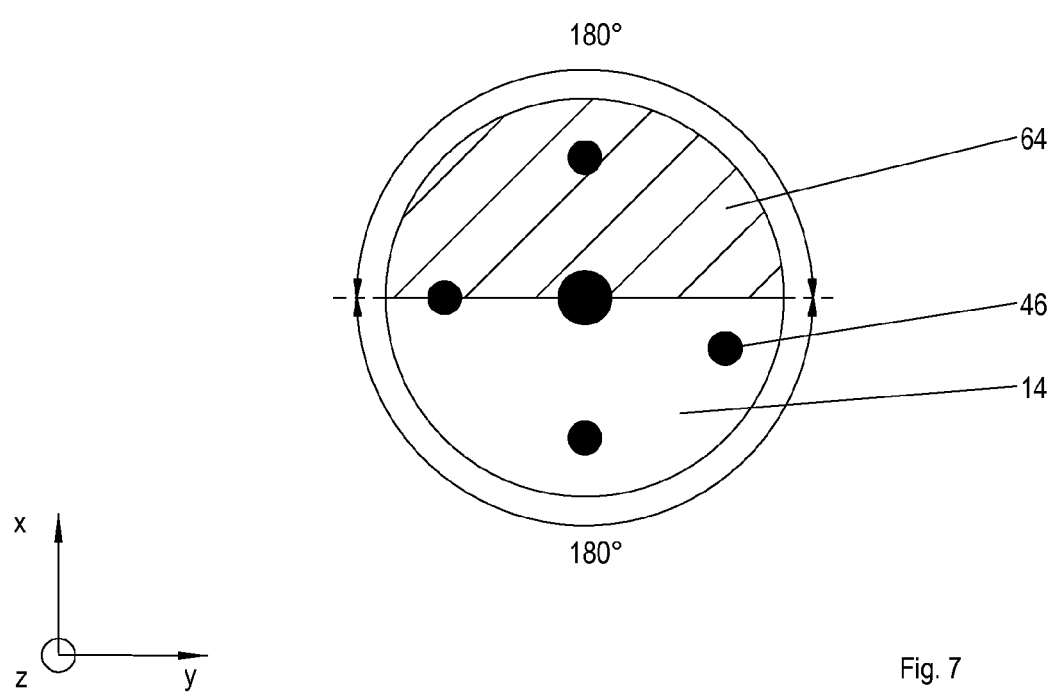
FIG. 7 is a top view of the device from FIG. 2.

As opposed to the aforementioned example for a method according to FIG. 1a to 4, the depressions 22, 24 and seam gap 30 are not cleaned in the exemplary embodiment according to FIGS. 5, 6 and 7, but rather the fibrous plastic material 42 is injected into the depressions 22, 24 and seam gap 30 immediately after the milling process. In this case, at least the depressions 22, 24 are milled and the plastic material 42 is injected within a respective single rotational movement of ≤360°. In particular, the opposite arrangement of milling arms 18 and hollow arms 50 causes a milled depression section to become filled with the plastic material 42 after 180°.

Disclosed are a method for firmly joining fiber-reinforced, plastic-based adherends, wherein depressions are introduced into opposite lateral surfaces of the adherends, into which a fiber-reinforced plastic material serving as an adhesive is injected, a device for implementing such a method, as well as a component joined in this way.

The invention claimed is:

1. A method for joining fiber-reinforced, plastic-based adherends including opposing lateral surfaces, the method comprising:
    positioning the opposing lateral surfaces of the adherends to define a joining seam;
    introducing depressions into the lateral surfaces via a milling tool;
    filling up the depressions and a seam gap between the lateral surfaces with fibrous plastic material; and
    curing the fibrous plastic material,
    wherein the depressions are introduced with rotational movement of the milling tool and filled with the fibrous plastic material before one full rotation of the milling tool has been completed.

2. The method according to claim 1, wherein the depressions and the seam gap are cleaned before depressions are filled with the fibrous plastic material.

3. The method according to claim 1, further comprising unilaterally thickening the adherends in a joining area.

4. The method according to claim 1, wherein the fibrous plastic material is heated beyond its melting temperature so that a temperature of the fibrous plastic material causes depression walls to melt during the filling step.

* * * * *